Figure 1:
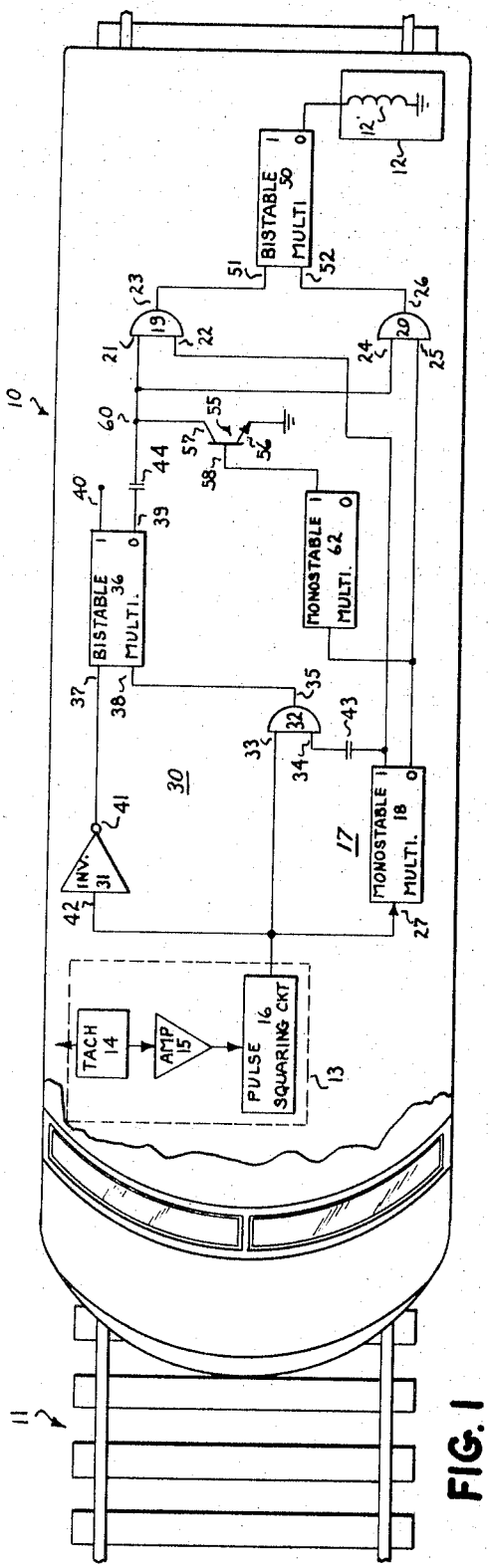

Sept. 12, 1967  H. VITT  3,340,951

SPEED CONTROL SYSTEM

Filed April 24, 1964  2 Sheets-Sheet 1

A. OUTPUT - 13
B. OUTPUT - MULTI. 18
C. OUTPUT - INV. 31
D. PULSES - PT. 60
E. OUTPUT - GATE 19
F. OUTPUT - GATE 20
G. OUTPUT - CKT. 50

INVENTOR.
HILLERT VITT
BY [signature]
HIS ATTORNEY

Sept. 12, 1967  H. VITT  3,340,951
SPEED CONTROL SYSTEM
Filed April 24, 1964  2 Sheets-Sheet 2
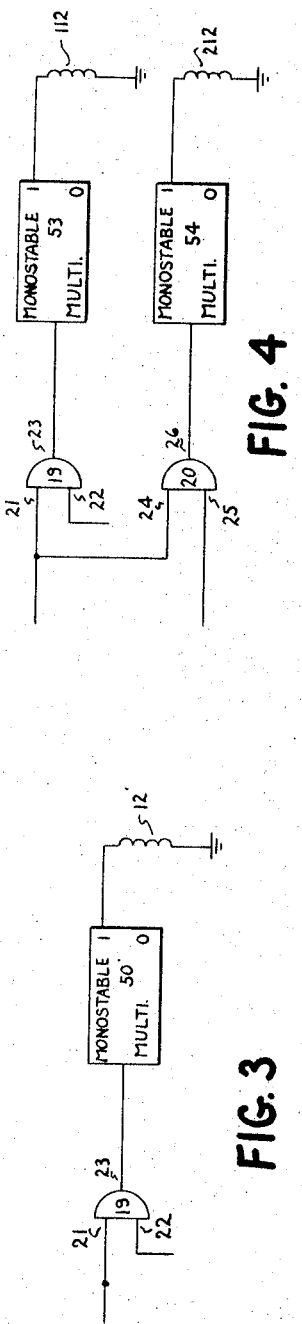
FIG. 4
FIG. 3
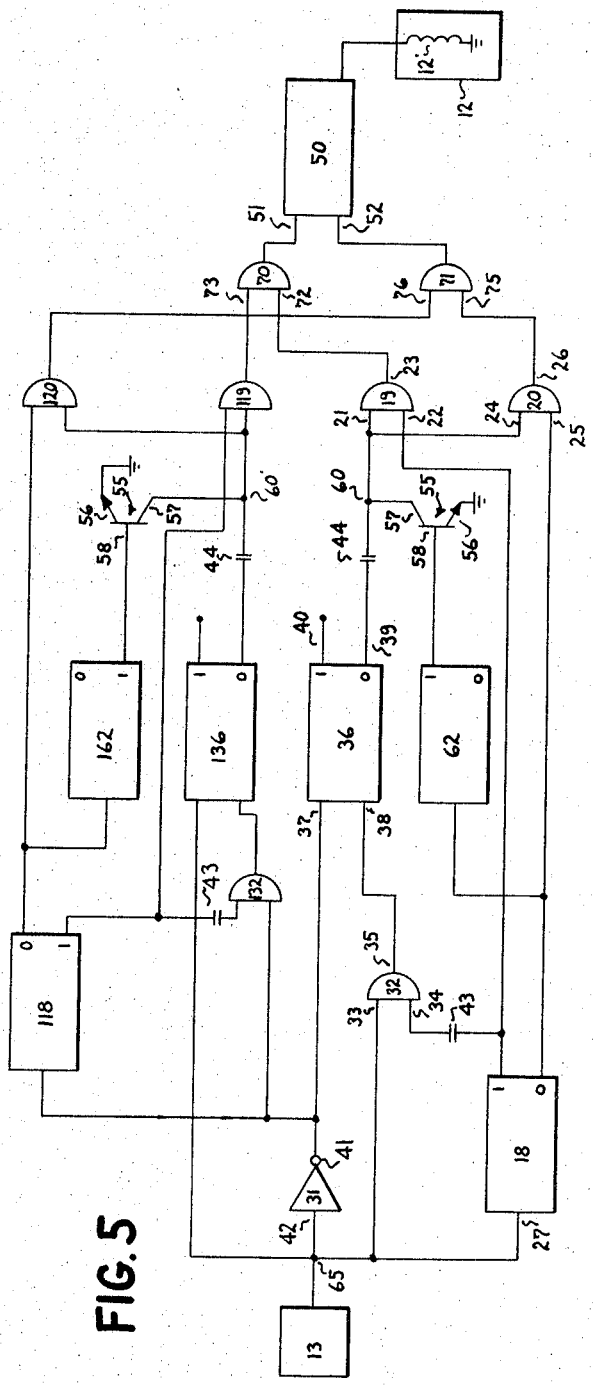
FIG. 5
INVENTOR.
HILLERT VITT
BY
HIS ATTORNEY

United States Patent Office 3,340,951
Patented Sept. 12, 1967

3,340,951
SPEED CONTROL SYSTEM
Hillert Vitt, Erie, Pa., assignor to General Electric
Company, a corporation of New York
Filed Apr. 24, 1964, Ser. No. 362,312
15 Claims. (Cl. 180—106)

This invention relates to speed control systems and more particularly to a novel error detecting arrangement for a speed control system especially suited for providing accurate and reliable control at low speeds. While this invention is subject to a wide range of applications, it is especially suited for use in providing low speed control for vehicles, such as locomotives and the like, for example, and will be particularly described in that connection.

For convenience and simplicity of explanation, the outputs obtained from the various logic type circuits employed in the different embodiments of the invention described in detail herein will be referred to by the binary designation "zero" and "one." Thus, one side of a monostable multivibrator will be referred to as the "zero" side or "zero" output side while the other side thereof will be referred to as the "one" side or the "one" output side. Also, the two output sides of a bi-stable circuit will be similarly referred to by the terms "zero" and "one."

In the widely utilized prior art speed control systems, it is customary to employ a unidirectional speed control feedback signal having a magnitude which is a function of actual speed; such feedback signal often being derived from a tachometer-generator which produces an output having a frequency which is proportional to actual speed. At low speeds, however, the frequency of the tachometer-generator output signal is very low so that it is difficult to derive a satisfactory unidirectional output for use as the speed feedback signal. Accordingly, such prior art speed control system have not been entirely satisfactory for applications requiring accurate control at low speeds.

It has been found desirable in an increasing number of applications, moreover, to provide accurate and reliable speed control for vehicles at speeds below about five miles per hour and even in some applications in the speed range of about ½ to ⅛ mile per hour. For example, in railroad classification yards, it would be extremely desirable to provide accurate speed control in the speed range of about one to four miles per hour in order to achieve maximum yard output. Also, in various vehicle loading and unloading applications, particularly those involving trains carrying one typpe of commodity only, such as coal, it would be very desirable to provide accurate and reliable low speed control since in many cases the speeds must be in the range of about ½ to ⅛ mile per hour and are ordinarily so limited by the capacity of the available ground facilities. Since the known prior art speed control systems have not been entirely satisfactory for such type of applications, there has remained a continuing need for a speed control system which is simple, inexpensive to produce, and provides fast, accurate and reliable speed error detection at speeds below about five miles per hour.

It is an object of this invention, therefore, to provide a speed control system which achieves the foregoing desiderata.

Briefly stated, in accordance with one aspect of this invention, a novel system is provided for controlling the speed of a vehicle. The system includes means for developing electrical speed indicating pulses having a width inversely related to the actual speed of the vehicle. The system also includes means for providing a reference time base representing a desired vehicle speed and means for comparing the widths of the speed indicating pulses to the reference time base to provide an error signal indicative of a difference between the actual and desired speed. The system further includes means responsive to the error signal so produced to produce a control signal. This control signal may then be applied to a suitable utilization means, such as the vehicle governor control means, for example, which is operative to vary the speed of the vehicle so as to maintain the desired speed.

Figure 2:
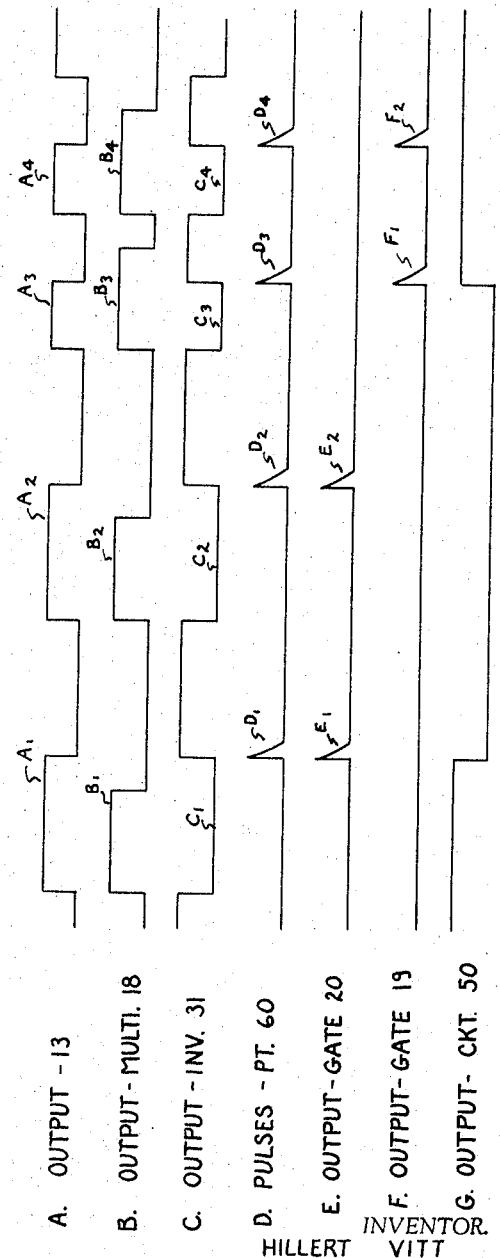

The novel features believed characteristic of this invention are set forth with particularity in the appended claims. The invention itself, however, together with further objects and advantages thereof, will best be understood by reference to the following description taken in conjunction with the accompanying drawing wherein like reference numerals identify the same or similar components and in which:

FIG. 1 is a block diagram of one embodiment of the invention;
FIG. 2 is a waveform diagram useful in explaining the operation of the system of FIG. 1;
FIGS. 3 and 4 are partial block diagrams illustrating alternate means of deriving the speed control signal; and,
FIG. 5 is a block diagram of another embodiment of this invention having a sampling rate double that of the system of FIG. 1.

In FIG. 1 there is shown a block diagram of a speed control system in accordance with one embodiment of this invention for controlling the speed of a vehicle, shown as the locomotive 10 on the railway 11. Locomotive 10 is provided with a suitable power control means 12 for controlling the speed of the vehicle by varying traction power in accordance with the control signal provided by the speed control system of this invention.

The particular speed control means 12 forms no part of the present invention and may be selected from any of the well-known means suitable for the desired application. For example, for a locomotive application, it may be convenient to employ a suitable power operated rheostat such as an electromagnetically controlled, hydraulically operated rheostat connected in well-known manner in the electrical transmission system. Thus, for example, one direction of motion of the rheostat, in response to a given characteristic of the applied control signal, may provide for increased generator excitation with a resulting vehicle acceleration while the opposite direction of motion of the rheostat, in response to another characteristic of the applied control signal, may provide for decreased generator excitation with a resulting deceleration in vehicle speed; the applied control signals being conveniently employed to cause selective operation of the electromagnet valves controlling the rheostat. Alternatively, one characteristic of the applied control signal may provide for suitably counterbalancing the application of either brakes or power to suitably vary the speed of the vehicle. Any other suitable means for varying the speed of the vehicle in response to an applied control signal may be employed. For simplicity, therefore, the responsive means of the speed control means 12 will be shown schematically, in the different embodiments of the invention described in detail herein, as one or more electrical windings 12' which may be suitably energized by the applied control signal. It will be understood, therefore, that the windings 12' may be associated with any suitable control means such as, for example, relays, electromagnet valves, magnetic amplifiers or the like.

As shown in FIG. 1, therefore, the control system includes means 13 for developing electrical speed indicating pulses having a width inversely related to the actual speed of the vehicle. Conveniently, suitable speed indicating pulses may be derived from the output of an alternator, a phototachometer, or other suitable means. For example, such speed indicating pulses may be developed by providing a tachometer-generator 14, which may be conveniently driven by an axle of the vehicle, for generating an alternating voltage having a frequency related directly to the actual vehicle speed. This generated voltage may be then suitably amplified, limited and shaped to provide electrical speed indicating pulses with a desired amplitude and rise time. To this end, the output of the tachometer-generator 14 may be applied to amplifier 15 and a pulse squaring circuit 16. The speed indicating signals produced thereby will then be as shown at A in FIGURE 2 with the width of the pulses representing the actual speed of the vehicle. Thus, for example, the narrower pulses at the right portion of the group indicate a higher speed than do the wider pulses at the left portion thereof. Since at low speeds the half wave symmetry of the tachometer voltage is often poor, it is often preferable to provide speed indicating pulses which are one cycle long. That is, one speed indicating pulse would be provided for each full cycle of the generated tachometer voltage. This may be conveniently provided, for example, by the addition of a bi-stable circuit (not shown) interposed between the output of pulse squaring circuit 16 and the remainder of the system.

The system also includes means for providing a reference time base against which the speed indicating pulses may be compared to determine whether the actual vehicle speed is greater or less than the desired speed. To this end, means 17 are provided for producing a speed reference pulse starting coincidently with an applied speed indicating pulse and having a fixed width representing a desired vehicle speed. Means 17 may be, for example, a monostable multivibrator 18, which is a circuit well known in the art and produces an output pulse of a predetermined width in response to an applied triggering pulse.

The width of the speed indicating pulse is then compared with that of the speed reference pulse. As shown, this may conveniently be provided by first and second coincidence gating means such as the AND gates 19 and 20 respectively. Each of the AND gates includes first and second input means and an output means. Thus, AND gate 19 includes the first and second input means 21 and 22 and an output means 23. Similarly, AND gate 20 includes the first and second input means 24 and 25 and the output means 26. The desired pulse width comparison is achieved by triggering the speed reference pulse producing means 17 with the speed indicating pulses from means 13 and then suitably coincidence gating the pulses so as to provide an output pulse from one AND gate indicating an actual speed greater than the desired speed, or an output pulse from the other AND gate indicating an actual speed less than the desired speed. Since the output pulses so produced may represent the difference, or the existence of a difference, between the actual and desired speeds, they will be referred to throughout the specification and in the appended claims as "error pulses."

This pulse width comparison may be provided, therefore, by applying the speed indicating pulses from means 13 to the input means 27 of multivibrator 18 to cause a pulse of fixed width to be produced thereby which starts coincidently with the applied speed indicating pulse. At the end of the cycle, the speed indicating pulses are applied to input means 21 of AND gate 19 and input means 24 of AND gate 20. Also, the "one" output of multivibrator 18, indicating the unstable state thereof and hence the presence of a speed reference pulse, is applied to the other input means 22 of AND gate 19 while the "zero" output of multivibrator 18, indicating cessation of a speed reference pulse, is applied to the other input means 25 of AND gate 20. Thus, to the extent that a given level of the speed indicating pulse and the corresponding level of the speed reference pulse are present at the same time, an error pulse will be produced by AND gate 19 indicating an actual speed greater than the desired speed. Similarly, to the extent that a given level of the speed indicating pulse is present after cessation of the corresponding level of the speed reference pulse, an error pulse will be produced by AND gate 20 indicating an actual speed less than the desired speed.

Since actual speeds more than twice the desired speed could result in an erroneous system response, the system is preferably provided with a suitable means, generally designated at 30, for inhibiting erroneous output signals from means 13. Means 30 includes an inverter circuit means 31, coincidence gating means, shown as the AND gate 32 having input means 33 and 34 and output means 35, and a bi-stable circuit means, shown as a bi-stable multivibrator 36 having first and second input means 37 and 38, a "zero" output means 39 and a "one" output means 40. The output appearing at output means 41 of inverter circuit means 31, which is of a polarity opposite that of the signal appearing at its input means 42, is applied to the input means 37 of multivibrator 36. The output of speed indicating pulse producing means 13 is applied to input means 42 of inverter circuit 31, one input means 33 of AND gate 32, and input means 27 of monostable multivibrator 18. The "one" output side of multivibrator 18 is applied through a capacitance 43 to the other input means 34 of AND gate 32 and the output of the AND gate is applied to input means 38 of bi-stable multivibrator 36.

The operation of the foregoing described speed error detection arrangement of the speed control system of FIG. 1 may best be understood by referring to the waveforms, and their time relationships, shown in FIG. 2 and by assuming the mutivibrator circuits 18 and 36 to be triggered only by a rising or positive going portion of an applied input pulse.

The speed indicating pulses from means 13 are shown at $A_1$–$A_4$ in FIG. 2 and are applied sequentially, in common, to the respective input means 42, 33 and 27 of inverter 31, AND gate 32 and multivibrator 18. The positive going portion of the first speed indicating pulse $A_1$, therefore, is operative to trigger multivibrator 18 to provide an output from the "one" side thereof which is applied to input means 34 of AND gate 32. Thus, since multivibrator 18 is triggered by speed indicating pulse $A_1$, a speed reference pulse $B_1$ is started coincidently therewith. Both the speed indicating pulse from means 13 and the speed reference pulse from multivibrator 18 are then supplied through AND gate 32 to input means 38 of bi-stable multivibrator 36. The positive going portion of the output pulse from AND gate 32 (not shown), therefore, is operative to trigger multivibrator 36 resulting in an output appearing at the "one" output means 40 thereof. At the same time the positive going portion of speed indicating pulse $A_1$ appears at the input means 37 of multivibrator 36 as the negative going portion of pulse $C_1$. Multivibrator 36, however, remains in its "one" output state since it is triggered only by an applied positive going signal. At the duration of speed indicating pulse $A_1$, however, the negative going portion thereof appears at input means 37 as the positive going portion of pulse $C_1$ which triggers multivibrator 36 to reset it to its "zero" state. Due to capacitance 44, this resetting causes a reset pulse $D_1$ to appear at the respective input means 21 and 24 of AND gates 19 and 20.

As shown in FIG. 2, therefore, if the reset operation of multivibrator 36 takes place after multivibrator 18 has returned to its "zero" state, indicating cessation of the speed reference pulse, AND gate 20 will be enabled since the reset pulses $D_1$ (or $D_2$) from multivibrator 36 provide one input thereto while the "zero" output of multivibrator 18 provides the other input. For example, the reset pulses $D_1$ (or $D_2$) are applied to input means 24 of AND gate 20 while the "zero" output of multivibrator 18 is applied to input means 25 thereof so that the reset pulses are transmitted therethrough to provide the error pulses, shown at $E_1$ and $E_2$ in FIG. 2, indicating an actual speed less than the desired speed.

Conversely, if the inverted speed indicating pulse from inverter circuit means 31 appears at input means 37 of multivibrator 36 before multivibrator 18 has returned to its "zero" state, indicating that the speed reference pulse is still present, then AND gate 19 will be enabled since the reset pulses $D_3$ (or $D_4$) from multivibrator 36 provide one input thereto while the "one" output of multivibrator 18 provides the other input. For example, the reset pulses $D_3$ (or $D_4$) are applied to input means 21 of AND gate 19 while the "one" output of multivibrator 18 is applied to input means 22 thereof so that the reset pulses are transmitted through AND gate 19 to provide the error pulses, shown at $F_1$ and $F_2$ in FIG. 2, indicating an actual speed greater than the desired speed.

The system as shown in FIG. 1 further includes means for translating the error pulses so produced into a suitable control signal for application to the speed control means 12. For example, means may be provided for providing a control signal in response to the error pulses having one level when the actual speed is greater than the desired speed and a different level when the actual speed is less than the desired speed. Thus, for example, a zero voltage level may be employed to indicate an actual speed less than desired speed with a positive voltage level indicating a speed greater than desired. This may be conveniently provided, as shown in FIG. 1, by a suitable bi-stable circuit, shown as bi-stable multivibrator 50, which changes from one stable operating state to the other in response to input pulses applied to the respective input means 51 and 52 thereof. The error pulse from AND gate 19 is applied to input means 51 while the error pulse from AND gate 20 is applied to input means 52. Thus, the error pulse applied to input means 51 is operative to cause multivibrator 50 to assume its "one" output state, for example, while the error pulse applied to input means 52 is operative to cause multivibrator 50 to assume its "zero" output state.

Assume, for example, that the control means 12 is so arranged as to cause power to be applied to the vehicle causing acceleration thereof as long as winding 12' remains de-energized. In such an arrangement, therefore, it is only necessary to determine when the actual vehicle speed is greater than the desired speed and to correct accordingly. That is, power is always increasing and the control signal is operative to reduce power the required amount. This may be conveniently provided as shown in FIG. 1 by utilizing the "one" output of multivibrator 50 to energize winding 12' to effect the desired decrease in power.

Alternatively, the desired control signal to energize winding 12' may be provided by employing a monostable rather than a bi-stable circuit. This arrangement is shown in FIG. 3 wherein only a partial block diagram of the system is illustrated. As shown in FIG. 3, therefore, a monostable multivibrator 50' and a single "too fast" AND gate 19 are employed. The output pulse from AND gate 19 is employed to trigger multivibrator 50' causing winding 12' to be energized for a time determined by the duration of the output from multivibrator 50'.

For some applications it may be more convenient to provide a control signal having one polarity for an actual vehicle speed greater than desired and the opposite polarity for an actual vehicle speed less than desired. This may be conveniently provided with the arrangement shown in FIG. 4. As shown therein, the error pulses indicating an actual vehicle speed greater than desired are applied to trigger a monostable multivibrator 53 while the error pulses indicating an actual vehicle speed less than desired are applied to trigger the monostable multivibrator 54. The control signal derived from the outputs of multivibrators 53 and 54 may then be utilized in any suitable manner to vary the speed of the vehicle. For example, the output of multivibrator 53 may be employed to energize winding 112 while the output of multivibrator 54 may be employed to energize winding 212 arranged when energized to control for "too slow" and "too fast" operation respectively. Thus, for example, windings 112 and 212 may be the windings of electromagnet valves of a hydraulically operated rheostat associated with speed varying means 12.

Since speed indicating pulses representing speeds above and below the desired speed can be received with only a slight difference in vehicle speed, means are preferably provided to maintain a definite controlled differential between actual speeds which are greater and less than the desired speed. This is conveniently provided as shown in FIG. 1 by including means for nullifying the reset pulse input to AND gates 19 and 20 for a short period after cessation of the speed reference pulse. As shown, this may be provided by a transistor 55 having an emitter electrode 56, a collector electrode 57 and a base electrode 58. The transistor 55 is connected so as to shunt the reset pulse from multivibrator 36 to a point of reference potential, such as ground, through the emitter-collector circuit when the transistor is in a conducting state. Thus, the collector-emitter circuit of transistor 55 is connected from the point 60 to a source of reference potential, such as ground, to provide the desired shunt path to thereby remove the reset pulse input to input means 21 and 24 of AND gates 19 and 20 respectively when transistor 55 is rendered conductive. Transistor 55 is rendered conductive to shunt the reset pulses from the AND gate input means 21 and 24 by applying the "one" output of a monostable multivibrator 62 to base electrode 58 of transistor 55. Multivibrator 62 is triggered by a signal derived from multivibrator 18 as it is returned to its stable, or "zero," output state indicating cessation of a speed reference pulse. Transistor 55, therefore, is rendered conductive to shunt the inputs 21 and 24 of AND gates 19 and 20 for a time determined by the time duration of the output of monostable multivibrator 62. Thus, a "dead band" is conveniently provided so that a definite controlled differential is obtained between actual vehicle speeds at and below the desired speed.

In FIG. 5 there is shown a block diagram of a speed control system in accordance with another embodiment of this invention wherein the sampling rate has been increased to provide the system with still more improved control characteristics at very low speeds. For example, at the very low speeds the sampling rate of the system of FIG. 1, providing only one error output for two cycles of the output of tachometer-generator 14, may not be high enough to provide the desired system response for some applications. The sampling rate may be readily increased, however, by adding some error detection channels while combining the coincidence gates to obtain a single output. The system may be arranged to provide for a sampling rate which is double that of the system of FIG. 1 by provision of one additional error detection channel. It will be understood by those skilled in the art, however, that the sampling rate may be increased other than by doubling. For example, the system may be arranged to provide detection of errors once every half cycle of the input signal. Moreover, for some applications it may be desirable to add error detecting channels providing detection of errors at ¾ and 1½ times desired vehicle speed particularly for applications where extremely low vehicle speeds are required and erratic vehicle loading is encountered. Also, it may be desirable to provide increased gain for the error signals from these additional channels.

In FIG. 5 there is shown a speed control system having a sampling rate which is double that of the system shown in FIG. 1. As shown, the system of FIG. 5 includes two reference circuit means and associated error detecting circuits arranged to operate 180° out of phase with each other. For example, one error detecting channel is similar to that shown in FIG. 1 and includes the multivibrator 18 for producing the speed reference pulse, the AND gate 32, bi-stable multivibrator 36 and the "too fast" and "too slow" AND gates 19 and 20 respectively. The other error detecting channel is the duplicate of the first and includes multivibrator 118 for producing the other speed reference pulse, the AND gate 132, bistable multivibrator 136 and the "too fast" and "too slow" AND gates 119 and 120 respectively. By duplicating the portions of the circuit of FIG. 1 as described above, double the number of error pulses are provided. For example, as shown in FIG. 2, an error pulse indicating either too fast or too slow operation is obtained only once every cycle of the incoming speed indicating pulses $A_1$–$A_4$. The arrangement shown in FIG. 5, however, makes it possible to obtain an error pulse twice each cycle of the incoming speed indicating pulses $A_1$–$A_4$ shown in FIG. 2.

When a rising or positive going portion of the speed indicating pulse $A_1$ is applied to the point 65, the circuits 18, 32, 36, 19 and 20 all operate as described in detail with respect to FIG. 1 to produce the error pulses shown at E or F in FIG. 2. That is, the comparison required to determine if a velocity error exists is made when the falling or negative going portion of the speed indicating pulses $A_1$–$A_4$ is applied to the point 65. At that time, however, the signal at the output 41 of inverter circuit means 31 exhibits a rising or positive going portion thereby causing the related error detecting circuit portion 118, 132, 136, 119 and 120 of the second channel to function in exactly the same manner as did the circuits 18, 32, 36, 19 and 20 when the rising or positive going portion of the speed indicating pulse $A_1$, for example, was applied to the point 65. Accordingly, when the signal at input means 42 of inverter 31 once again rises the signal at output means 41 thereof falls, to permit a pulse width comparison to be made in the circuits 118, 132, 136, 119 and 120 to determine if a velocity error exists at that time in the same manner previously described with respect to FIG. 1. Thus, the initiation of the timing cycle and comparison of the widths of the speed indicating and speed reference pulses to determine the velocity error is repeated in each error detecting channel on alternate half cycle of the speed indicating pulse.

The error pulses appearing at the outputs 23 and 123 of AND gates 19 and 119, respectively, indicate an actual speed greater than the desired speed while the error pulses appearing at the outputs 26 and 126 of AND gates 20 and 120, respectively, indicate an actual speed less than the desired speed. The error pulses from the two channels are then combined, such as in circuits 70 and 71 respectively, which may conveniently be OR circuits. OR circuits are circuits well known in the art for providing an output when a signal is present at either but not both, of its input means. Thus, the output pulses from AND gate 19 are applied to one input means 72 of OR circuit 70 while the output pulses from AND gate 119 are applied to the other input means 73 thereof. Similarly, the output pulses from AND gate 20 are applied to one input means 75 of OR circuit 71 while the output pulses from AND gate 120 are applied to the other input means 76 thereof. The outputs of the OR circuits 70 and 71 may then be utilized as before to operate one or more bi-stable or monostable circuits to provide the desired control signal. Thus, for example, the output of OR circuit 70 may be applied to input means 51 of bi-stable circuit 50 while the output of OR circuit 71 is applied to input means 52 thereof.

While only certain perferred features of the invention have been shown by way of illustration, many changes and modifications will occur to those skilled in the art. It is, therefore, to be understood that the appended claims are intended to cover all such changes and modifications as fall within the true spirit and scope of the invention.

What I claim as new and desire to secure by Letters Patent of the United States is:

1. In a system for controlling the speed of an element, the combination comprising: means for varying the speed of said element; means for developing electrical speed indicating pulses having a width inversely related to the actual speed of said element; means responsive to the application of a speed indicating pulse for producing a speed reference pulse starting coincident with said speed indicating pulse and having a fixed width representing a desired speed; means for comparing the widths of said speed indicating and speed reference pulse including first means to proved a first error pulse indicative of an actual speed greater than said desired speed and second means to provide a second error pulse indicative of an actual speed less than said desired speed; means responsive to said error pulses for producing a control signal; and means applying said control signal to said means for varying the speed of said element.

2. In a system for controlling the speed of an element, the combination comprising: means for varying the speed of said element; means for developing electrical speed indicating pulses having a width inversely related to the actual speed of said element; means responsive to the application of a speed indicating pulse for producing a speed reference pulse starting coincident with said speed indicating pulse and having a fixed width representing a desired speed; means for comparing the width of said speed indicating and speed reference pulses including first means responsive to the trailing edge of a speed indicating pulse to provide a first error pulse indicative of an actual speed greater than said desired speed and including second means responsive to the trailing edge of a speed indicating pulse to provide a second error pulse indicative of an actual speed less than said desired speed; means responsive to said error pulses for producing a control signal having a given polarity in response to said first error pulse and a reverse polarity in response to said second error pulse; and means applying said control signal to said means for varying the speed of said element.

3. In a speed control system, the combination comprising: means for developing speed indicating pulses whose width is inversely related to actual speed; means responsive to an applied speed indicating pulse for producing a speed reference pulse starting coincident with said applied speed indicating pulse; first coincidence gating means enabled by a first input representing a given level of said speed indicating pulse and a second input representing a corresponding level of said speed reference pulse to provide an output indicative of an actual speed greater than desired; and second coincidence gating means enabled by a first input representing said given level of said speed indicating pulse and a second input representing the absence of the corresponding level of said speed reference pulse to provide an output indicative of an actual speed less than desired.

4. A system according to claim 3 including means coupled to said means for producing a speed reference pulse and responsive to the trailing edge of each speed reference pulse for preventing said first and second coincidence gating means for responding to the speed indicating pulses for a predetermined time to provide a dead band of speeds to which the system does not respond.

5. A system according to claim 3 including means coupled to said means for producing a speed reference pulse and responsive to the speed reference pulse for coupling said first input representating said given level of said speed indicating pulse to said coincidence gating means and preventing said first input from being so coupled without the generation of a corresponding speed reference pulse.

6. A system according to claim 5 wherein said means responsive to the speed reference pulses includes bistable circuit means having first and second output means, means for coupling an input representative of the initial portion of a speed reference pulse to an input of said bistable circuit to cause said bistable circuit to energize said first output means, and means for coupling the speed indicating pulses to an input of said bistable circuit so that the end portion of the speed indicating pulse causes said bistable circuit to energize said second output means, signals from said energized second output means comprising said first inputs of said first and second coincidence gating means.

7. A speed control system for vehicles comprising: means for developing electrical speed indicating pulses having a width inversely related to the actual speed of said vehicle; means responsive to the application of a speed indicating pulse for producing a speed reference pulse starting coincident with said speed indicating pulse and of a width representative of a desired vehicle speed; first and second coincident gating means each having first and second input means and an output means; means applying said speed indicating pulses to said speed reference pulse producing means and one input means of each of said coincidence gating means; means applying a signal representing the presence of a speed reference pulse to the second input means of said first coincidence gating means and a signal representing the absence of said speed reference pulse to the second input means of said second coincidence gating means so that an output of said first coincidence gating means provides an error signal indicating a speed greater than said desired speed and an output of said second coincidence gating means provides an error signal indicating a speed less than said desired speed; means responsive to said error signals for deriving a control signal; means for varying the speed of said vehicle; and means for applying said control signal to said means for varying the speed of said vehicle.

8. A speed control system for vehicles comprising: means associated with said vehicle for varying the speed thereof; means for generating a voltage having a frequency proportional to the actual speed of said vehicle; means for converting said generated voltage into electrical speed indicating pulses each having a width inversely proportional to the actual speed of said vehicle; means actuated by each of said speed indicating pulses for causing a speed reference pulse to be produced having a width representative of a desired vehicle speed; first coincidence gating means responsive to applied inputs representative of the presence of a speed indicating pulse and its associated speed reference pulse for producing a first error pulse; second coincidence gating means responsive to applied inputs representative of the presence of a speed indicating pulse and the absence of its corresponding speed reference pulse for producing a second error pulse; bi-stable circuit means selectively responsive to said first and second error pulses for producing a speed control signal; and means applying said speed control signal to said means for varying the speed of said vehicle to maintain said desired speed.

9. A speed control system for vehicles comprising: means for varying the speed of said vehicle; means for developing electrical speed indicating pulses each of which has a width inversely related to the actual speed of said vehicle; means actuated by each of said speed pulses for causing a speed reference pulse to be produced the width of which is representative of a desired vehicle speed; first coincidence gating means responsive to inputs representative of the trailing edge presence of a speed indicating pulse and the presence of a speed reference pulse for producing a first error pulse indicative of a speed greater than said desired speed; second coincidence gating means responsive to inputs representative of the trailing edge presence of a speed indicating pulse and the absence of a speed reference pulse for producing a second error pulse indicative of a speed below said desired speed; means responsive to said first and second error pulses for providing a control signal; and means applying said control signal to said means for varying the speed of said vehicle.

10. A speed control system for vehicles comprising: means for developing electrical speed indicating pulses each of which has a width inversely related to the actual speed of said vehicle; means actuated by each of said speed indicating pulses for causing a speed reference pulse to be produced the width of which is representative of a desired vehicle speed; first coincidence gating means responsive to inputs representative of the presence of a speed indicating pulse and a speed reference pulse for producing a first error signal indicative of a speed greater than said desired speed; second coincidence gating means responsive to inputs representative of the presence of a speed indicating pulse and the absence of a speed reference pulse for producing a second error signal indicative of a speed below said desired speed; and utilization means responsive to said error signals for causing the speed of said vehicle to be varied to maintain the desired speed.

11. The speed control system of claim 10 wherein said utilization means includes means for integrating said error signals.

12. In a system for controlling the speed of an element, the combination comprising: means for developing electrical speed indicating pulses each of which has a width inversely related to the actual speed of said element; means actuated by each of said speed indicating pulses for causing an associated speed reference pulse to be produced having a width representative of a desired speed; first coincidence gating means responsive to applied inputs representative of the presence of a speed indicating pulse and its associated speed reference pulse for producing a first error pulse; second coincidence gating means responsive to applied inputs representative of the presence of a speed indicating pulse and the absence of its associated speed reference pulse to produce a second error pulse; means selectively responsive to said first and second error pulses for producing a control signal having a first voltage level for actual speeds greater than the desired speed and a second voltage level for actual speeds less than the desired speed; and means applying said control signal to said means for varying the speed of said element to maintain said desired speed.

13. A speed control system for vehicles comprising: means for developing electrical speed indicating pulses having a width inversely related to the actual speed of said vehicle; means responsive to an applied speed indicating pulse for producing a reference time base starting coincidently with said applied speed indicating pulse and representative of a desired vehicle speed; means for comparing the width of said speed indicating pulse with said reference time base including first means to provide a first error pulse indicative of an actual speed greater than the desired speed and second means to provide a second error pulse indicative of an actual speed less than the desired speed; and utilization means operative to cause deceleration of said vehicle when said first error pulse is produced and to cause acceleration of said vehicle when said second error pulse is produced.

14. The speed control system of claim 13 wherein said reference time base is provided by a pulse having a fixed width representative of the desired vehicle speed.

15. The speed control system of claim 14 wherein said means for producing the reference time base pulse is a monostable multivibrator triggered by the applied speed indicating pulse.

References Cited

UNITED STATES PATENTS

| | | | |
|---|---|---|---|
| 2,719,911 | 10/1955 | Maenpaa | 246—182 |
| 2,769,949 | 11/1956 | Stratton | 318—312 |
| 2,982,920 | 5/1961 | Feissel | 317—5 X |
| 3,005,940 | 10/1961 | Johnson | 318—313 |
| 3,116,807 | 1/1964 | Wilson | 180—82.1 |
| 3,153,746 | 10/1964 | Atkinson | 123—102 X |
| 3,154,730 | 10/1964 | Houldin et al. | 318—313 X |
| 3,176,208 | 3/1965 | Gifft | 318—314 |
| 3,182,301 | 5/1965 | Kolb | 340—263 X |
| 3,184,606 | 5/1965 | Ovenden et al. | |
| 3,200,340 | 8/1965 | Dunne. | |

KENNETH H. BETTS, *Primary Examiner.*

UNITED STATES PATENT OFFICE
CERTIFICATE OF CORRECTION

Patent No. 3,340,951                                September 12, 1967

Hillert Vitt

It is hereby certified that error appears in the above numbered patent requiring correction and that the said Letters Patent should read as corrected below.

Column 8, line 2, for "pulse" read -- pulses --; line 3, for "proved" read -- provide --; line 18, for "width" read -- widths --; line 51, for "for" read -- from --.

Signed and sealed this 6th day of May 1969.

(SEAL)
Attest:

Edward M. Fletcher, Jr.

Attesting Officer

Commissioner of Patents